United States Patent [19]

Albert

[11] Patent Number: 4,916,984
[45] Date of Patent: Apr. 17, 1990

[54] SHOVEL BLADE AND METHOD OF MANUFACTURE

[76] Inventor: Barry R. Albert, 203 S. Filey's Rd., Dillsburg, Pa. 17019

[21] Appl. No.: 270,471

[22] Filed: Nov. 8, 1988

Related U.S. Application Data

[62] Division of Ser. No. 169,511, Mar. 17, 1988, abandoned.

[51] Int. Cl.$^4$ .............................................. B21D 53/66
[52] U.S. Cl. .......................................... 76/113; 294/49
[58] Field of Search ............... 76/113, 101 D; 294/49, 294/55, 60

[56] References Cited

U.S. PATENT DOCUMENTS

| 142,859 | 9/1873 | Lowman | 76/113 |
|---|---|---|---|
| 628,202 | 7/1899 | Laws | 294/49 |
| 648,321 | 4/1900 | Westerberg | 294/49 |
| 843,179 | 2/1907 | Rodney | 294/49 X |
| 1,046,616 | 12/1912 | Loftsgaarden | 294/49 X |
| 1,423,775 | 7/1922 | Mundt | 294/60 |
| 1,518,246 | 12/1924 | Brandenburg | 294/49 |
| 1,579,027 | 3/1926 | Pailloncy | 76/113 |
| 3,474,535 | 10/1969 | Kramer | 294/49 X |
| 3,848,915 | 11/1974 | Wherry | 294/49 |

FOREIGN PATENT DOCUMENTS

| 6986 | of 1890 | United Kingdom | 294/49 |
|---|---|---|---|
| 18899 | of 1899 | United Kingdom | 294/60 |

Primary Examiner—Roscoe V. Parker
Attorney, Agent, or Firm—Barry E. Deutsch

[57] ABSTRACT

A shovel blade comprises a body portion having an elongated socket at its rearward end and a digging portion integral with the socket and extending laterally outwardly and forwardly therefrom. The socket has a predetermined straight portion of longitudinal extent. The digging portion includes peripheral edges having rearward sections extending outwardly from opposite sides of the socket. The rearward sections include a pair of longitudinally extending slots spaced on either side of and substantially adjacent to the socket. The peripheral edge extending laterally outwardly from each slot is bent at a substantial right angle to form a platform step.

2 Claims, 3 Drawing Sheets

SHOVEL BLADE AND METHOD OF MANUFACTURE

This is a divisional of application Ser. No. 169,511, filed on Mar. 17, 1988, now abandoned.

BACKGROUND OF THE INVENTION

This invention relates to shovel blades and in particular to relatively narrow width blades having integral platform steps.

The use of platform steps on the rearward edge of metal shovel blades is a well known expedient for enabling the shovel user to employ the power generated by the feet, in combination with power generated by the arms, in the digging process. In -relatively wide diameter shovel blades, notches can be formed extending laterally outwardly in each direction from the blade's socket. The notches are indented with respect to the rearward edge of the blade and thus the interface between the laterally extending notch and the remaining laterally extending rearward edge portion is defined by a longitudinally extending shoulder. The notches enable the remaining rearward edge portions to be readily bent to form a platform step.

Relatively narrow width blades are typically formed by trimming relatively wide width blades. As the trimming step removes a substantial portion of the rearward edge, a platform step cannot readily be formed on narrow width blades after the trimming step.

Thus, it has been the practice to trim the blade after the platform has been formed which results in a somewhat less than satisfactory platform due to its relatively limited lateral extent. Alternatively, platform steps have been separately formed from angle or channel stock and attached to the rearward peripheral edge by suitable means such as welding or mechanical fasteners. Such method not only increases the cost of producing narrow width shovel blades, but also may reduce the useful life of the shovel through failure of the weld or mechanical fasteners.

Accordingly it is an object of the invention to produce a relatively narrow width shovel blade having an integrally formed platform step.

SUMMARY OF THE INVENTION

The foregoing object and other objects of the invention are attained in a shovel blade comprising a body portion having an elongated socket section at its rearward end and a digging portion integral with said socket section and extending laterally outwardly and forwardly therefrom; said socket section having a predetermined straight direction of longitudinal extent; said digging portion including peripheral edges having rearward sections extending outwardly from opposite sides of said socket section; said rearward sections including a pair of longitudinally extending slots spaced on either side of and substantially adjacent to said socket section with the peripheral edge extending laterally outwardly from each slot being bent along a fold line at a substantial right angle to form a platform step.

The present invention is also attained in a method of forming a relatively narrow width shovel blade comprising the steps of trimming a relatively wide shovel blade to produce the relatively narrow width blade; forming in the blade a pair of longitudinally extending slots spaced on either side of and substantially adjacent to a blade socket; and bending each edge portion of the blade along a line perpendicular to and disposed radially outwardly of the longitudinally extending slots to form a platform step along the upper end of the blade on either side of the socket.

DESCRIPTION OF THE PREFERRED EMBODIMENT

Figure 1:
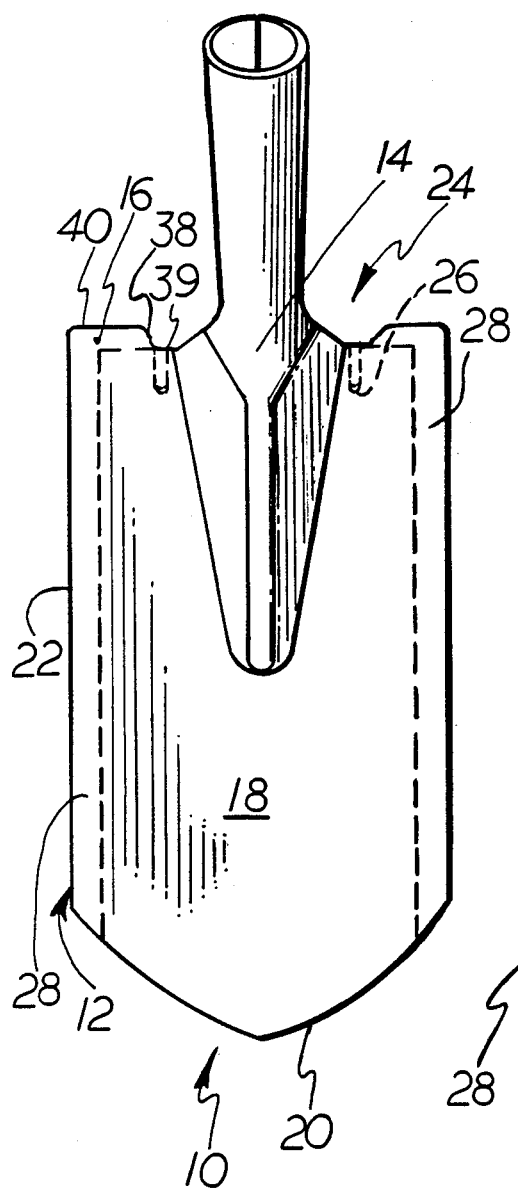
FIG. 1 is an elevational view of a shovel blade in accordance the present invention.
Figure 2:
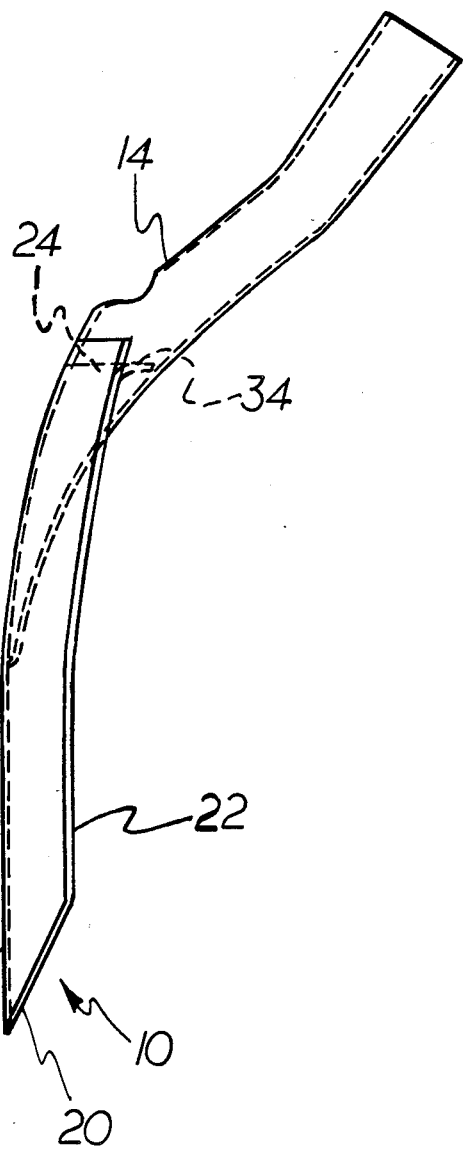
FIG. 2 is a side view of the shovel blade illustrated i FIG. 1.

Referring now to the various figures of the drawing, like numerals shall refer to like parts. Referring specifically to FIGS. 1 and 2, there is illustrated in solid line a somewhat conventional shovel blade which is illustrative of the blade prior to processing in accordance with the present invention. The phantom lines represent the shape of the shovel blade after processing, which shape is illustrative of the shovel blade in accordance with the present invention.

Specifically, shovel blade 10 includes a body portion 12 having an elongated socket section 14 at its rearward end 16 and a digging portion 18 integral with socket section 14. The digging portion extends laterally outwardly and forwardly from the socket section.

The socket section extends longitudinally from the rearward end 16 of the shovel blade towards the front end 20. Digging portion 18 includes peripheral edges 22 having a rearward section 24 extending outwardly from the opposite sides of socket section 14. Rearward section 24 includes first and second laterally extending sections 39 and 40. Section 40 extends radially outward from a vertical wall 38.

In FIGS. 1 and 2, the solid line peripheral portions represent the shovel blade before processing in a manner to be described hereinafter. The dotted lines represent the shape of the shovel blade after processing. As is readily apparent inverted L-shaped portions 28 of digging portion 18 are removed to provide a relatively narrow width shovel blade when compared to the width of the shovel blade before trimming.

As is also illustrated in FIG. 1, additional material is removed from the shovel blade to form longitudinally extending slots 26. Slots 26 are spaced on either side of and substantially adjacent to socket section 14. Slots 26 are formed for a reason to be more fully described hereinafter.

Figure 3:
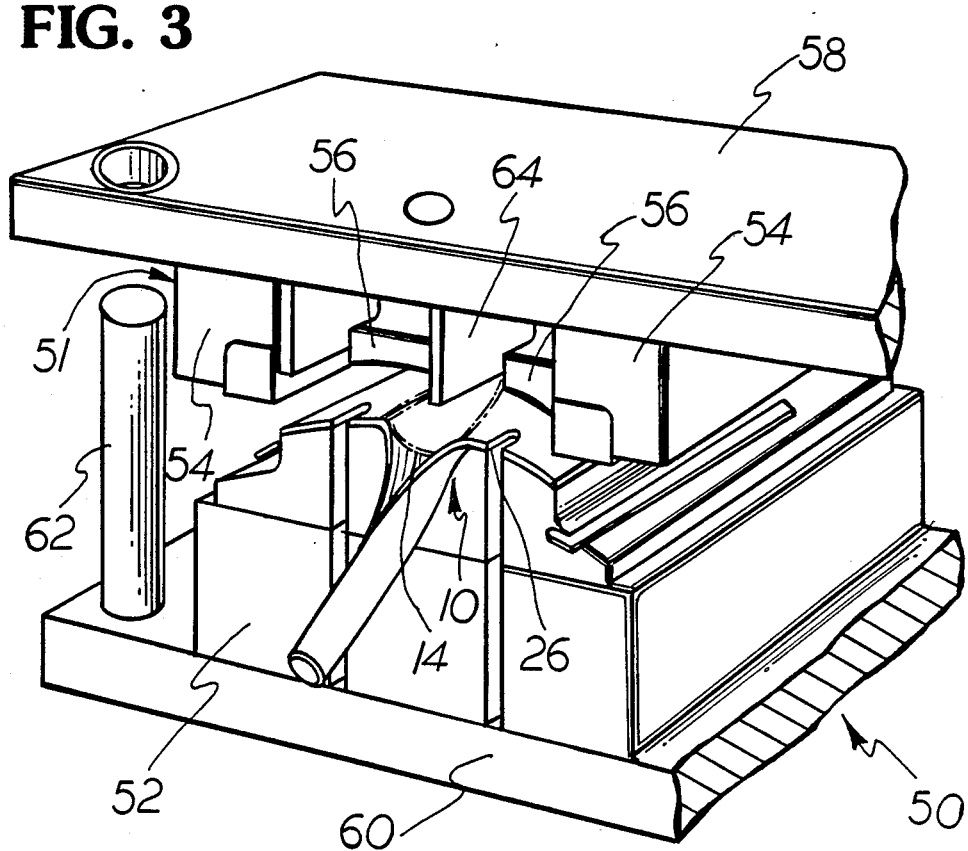
FIG. 3 is a perspective view illustrating a process step in forming the shovel blade of FIGS. 1 and 2.
Figure 4:
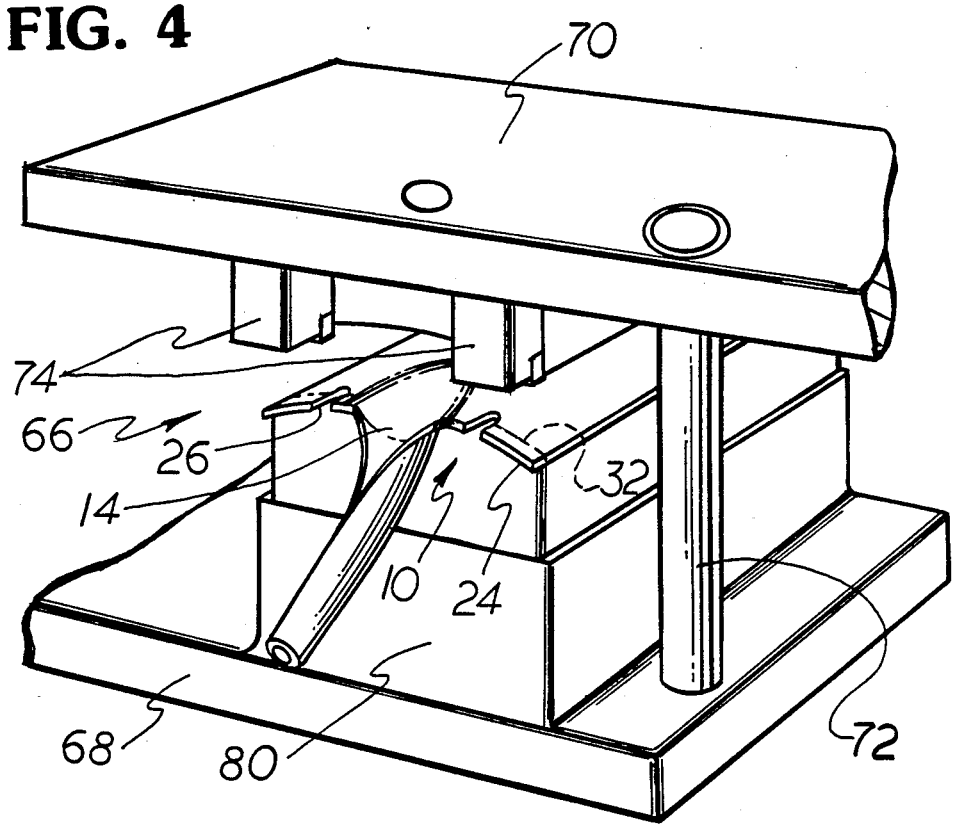
FIG. 4 is a perspective view of a second process step utilized in forming the shovel blade of FIGS. 1 and 2.

Referring now specifically to FIGS. 3 and 4, the process by which the shovel blade of the present invention is formed shall now be described in detail. Specifically, FIG. 3 illustrates a perspective, somewhat simplified view of a cutting station 50 comprising a press 51. Press 51 includes a bottom die or anvil 52 mounted on a support bed 60. Press 51 further includes an upper die support bed 58 which is movable relative to lower bed 60. Upper bed 58 supports thereon outside trimming dies 54, notch cutting dies 56, and a blade holding member 64. Centering rods 62 (only one of which is shown) are mounted at each corner of the generally rectangular lower bed 60 for guiding the upper movable support bed downwardly with respect to the lower bed.

As shall be more fully explained hereinafter, the shovel blade after having been processed at station 50 is conveyed to a second processing station 66 illustrated in FIG. 4. Station 66 includes a lower stationary support bed 68 having an anvil or bottom die 80 supported thereon. The station also includes an upper die support bed 70 movable relative to lower bed 68 and having supported thereon folding dies 74. Centering rods 72 (only one of which is shown) are mounted at each corner of the generally rectangular bottom bed 68 for guiding the movement of the upper die support member relative to the bottom bed.

As will be observed with reference to the shovel blade illustrated in FIG. 4, folding dies 74 function to bend the peripheral rearward section 24 of the shovel blade along a fold line 32 extending outwardly from each slot 26. Fold line 32 along which the material is bent is represented in phantom by dotted line 32. The material is bent to form platform step 34 illustrated in FIG. 2.

Still referring to FIGS. 3 and 4, to form the shovel blade of the invention, a relatively wide width shovel blade of the type illustrated in solid lines in FIG. 1 is placed on bottom die 52 of station 50. The upper movable bed is moved downwardly so that the holding die 64 engages the rear face of the shovel blade generally along its longitudinal center line. This firmly secures the shovel blade to bottom die 52.

Thereafter, outside trimming dies 54 and notch cutting die 56 are lowered to trim the desired material from blade 10. In particular, as illustrated in FIGS. 1 and 3, longitudinally extending slots 26 are formed and the width of the shovel blade is substantially narrowed so that the shovel blade conforms to the shape illustrated in FIG. 1 in phantom.

After this step has been completed, the relatively narrow width shovel blade is then moved to folding station 66. The trimmed shovel blade is placed on anvil or bottom die 80 and then the upper movable support member is lowered so that the folding dies 74 bend the peripheral edge of the shovel blade along fold line 32 to form platform step 34. By forming longitudinal slots 26 in the shovel blade, the platform step can be readily formed even though the width of the shovel blade is relatively narrow.

In the preferred embodiment the fold line extends laterally from substantially the center of the longitudinal length of each slot 26. Further, in the preferred embodiment the trimming step used to remove portions 28 is accomplished substantially simultaneously with the cutting step forming longitudinally extending slots 26.

As may be readily recognized, the process described above is relatively inexpensive to implement, yet is one which produces a relatively narrow width shovel blade having an integrally formed platform step.

While a preferred embodiment of the present invention has been described and illustrated, the invention should not be limited thereto but may be otherwise embodied within the scope of the following claims.

I claim:

1. A method of forming a relatively narrow width shovel blade comprising the steps of;
    trimming a relatively wide width shovel blade to produce the relatively narrow width blade;
    forming in the blade a pair of longitudinally extending slots spaced on either side of and substantially adjacent to a blade socket; and
    bending each edge portion of the blade along a line perpendicular to and disposed radially outwardly of the longitudinally extending slots to form a platform step along the upper edge of the blade on either side of the socket.

2. The method in accordance with claim 1 wherein the forming step is performed substantially simultaneously with the trimming step.

* * * * *